United States Patent
Choi

(10) Patent No.: US 11,752,876 B2
(45) Date of Patent: Sep. 12, 2023

(54) METHOD AND DEVICE FOR CONTROLLING REGENERATIVE BRAKING OF HYBRID COMMERCIAL VEHICLE

(71) Applicants: Hyundai Motor Company, Seoul (KR); Kia Motors Corporation, Seoul (KR)

(72) Inventor: Do Sun Choi, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 396 days.

(21) Appl. No.: 17/074,000

(22) Filed: Oct. 19, 2020

(65) Prior Publication Data
US 2021/0170877 A1    Jun. 10, 2021

(30) Foreign Application Priority Data

Dec. 9, 2019   (KR) .......................... 10-2019-0162858

(51) Int. Cl.
  *B60L 7/18*    (2006.01)
  *B60L 7/26*    (2006.01)
(52) U.S. Cl.
  CPC  *B60L 7/18* (2013.01); *B60L 7/26* (2013.01); *B60L 2240/12* (2013.01); *B60L 2240/14* (2013.01); *B60L 2240/26* (2013.01); *B60L 2250/26* (2013.01)
(58) Field of Classification Search
  CPC .......... B60L 7/18; B60L 7/26; B60L 2240/12; B60L 2240/14; B60L 2240/26; B60L 2250/26; B60L 2250/24; B60W 10/18; B60T 2270/60; B60Y 2300/18125
  See application file for complete search history.

(56) References Cited

U.S. PATENT DOCUMENTS

| | | | |
|---|---|---|---|
| 2017/0166063 A1* | 6/2017 | Cho | B60T 1/10 |
| 2017/0232849 A1* | 8/2017 | Yamamoto | B60L 7/26 |
| | | | 303/15 |
| 2018/0099675 A1* | 4/2018 | Boisvert | B60W 10/02 |
| 2018/0257491 A1* | 9/2018 | Tomita | B60T 8/171 |
| 2019/0193569 A1* | 6/2019 | Oh | B60L 7/26 |

OTHER PUBLICATIONS

Ford, Brakes—Exhaust Brake (If Equipped), 2018, 2018 F650750 Owner's Manual (Year: 2018).*

* cited by examiner

*Primary Examiner* — James M McPherson
*Assistant Examiner* — Kyle J Kingsland
(74) *Attorney, Agent, or Firm* — Fox Rothschild LLP

(57) ABSTRACT

A method for controlling regenerative braking of a hybrid commercial vehicle that includes a main brake and an auxiliary brake is provided. The method includes determining whether a braking request condition of the vehicle is satisfied based on a state data and generating a request braking amount based on the state data when the braking request condition is satisfied. When an operation switch of the auxiliary brake is on an auxiliary braking amount of the auxiliary brake is generated. A final braking amount is generated based on the request braking amount and the auxiliary braking amount. A regenerative braking amount is generated based on the final braking amount and braking of the vehicle is performed based on the final braking amount.

10 Claims, 4 Drawing Sheets

METHOD AND DEVICE FOR CONTROLLING REGENERATIVE BRAKING OF HYBRID COMMERCIAL VEHICLE

CROSS-REFERENCE TO RELATED APPLICATION

This application claims priority to and the benefit of Korean Patent Application No. 10-2019-0162858 filed on Dec. 9, 2019, the entire contents of which are incorporated herein by reference.

BACKGROUND

(a) Field of the Disclosure

The present disclosure relates to a regenerative braking control apparatus for a hybrid commercial vehicle (or a hybrid electric commercial vehicle), and more particularly, to a method and a device for controlling regenerative braking of a hybrid commercial vehicle capable of performing regenerative braking using an auxiliary brake.

(b) Description of the Related Art

A demand for an environmentally friendly vehicle is increasing as a demand for improving fuel efficiency of a vehicle is increasing and exhaust gas regulation of each country is strengthened. The environmentally friendly vehicle includes a hybrid vehicle (e.g., a hybrid electric vehicle). A hybrid vehicle is a vehicle that uses two or more power sources, and may be combined in various ways. The power sources include a gasoline engine or a diesel engine using a fossil fuel and a motor driven by electrical energy.

The hybrid vehicle includes an engine and a motor, and is driven by a power generated from combust action of the engine and a power generated from rotation of the motor using electrical energy stored in a battery. The hybrid vehicle uses a regenerative braking technology to improve fuel efficiency. In the regenerative braking technology, a part of a braking force of the vehicle is used as electricity generation, the generated electrical energy is charged in the battery, and a part of kinetic energy due to running of the vehicle is used as energy driving a generator of the vehicle. The regenerative braking technology reduces kinetic energy and generates electrical energy.

The hybrid vehicle is applied to a commercial vehicle. A hybrid commercial vehicle has a much larger weight than a regular vehicle, and thus a magnitude of an accident and a degree of damage are much greater in an event of an accident of the hybrid commercial vehicle. A weight of a high weight hybrid commercial vehicle is about 140% of weight of the regular vehicle, and thus, a fatal accident of the high weight hybrid commercial vehicle occurs more than the regular vehicle.

The hybrid commercial vehicle includes a variety of auxiliary brakes since a main brake such as a foot brake which holds and restrains a wheel of the vehicle does not achieve sufficient braking force. Accordingly, in the hybrid commercial vehicle, a regenerative braking technology using the auxiliary brake is being developed.

The above information disclosed in this section is merely for enhancement of understanding of the background of the disclosure, and therefore it may contain information that does not form the prior art that is already known in this country to a person of ordinary skill in the art.

SUMMARY

The present disclosure provides a method and a device for controlling regenerative braking of a hybrid commercial vehicle capable of performing regenerative braking using an auxiliary brake. Further, the present disclosure provides the method and the device for controlling regenerative braking of the hybrid commercial vehicle capable of increasing an amount of regenerative braking when the auxiliary brake is operated.

An exemplary embodiment of the present disclosure provides a method for controlling regenerative braking of the hybrid commercial vehicle that may include: determining, by a controller, whether a braking request condition of the vehicle is satisfied based on a state data; generating, by the controller, a request braking amount based on the state data when the braking request condition is satisfied; determining, by the controller, whether an operation switch of the auxiliary brake is on; generating, by the controller, an auxiliary braking amount of the auxiliary brake when the operation switch is on; generating, by the controller, a final braking amount based on the request braking amount and the auxiliary braking amount; generating, by the controller, a regenerative braking amount based on the final braking amount; and performing, by the controller, braking of the vehicle based on the final braking amount.

The generating of the request braking amount may include: checking, by the controller, a position value of a brake pedal of the vehicle and an acceleration value of the vehicle that are included in the state data when the braking request condition is satisfied; checking, by the controller, a weight of the vehicle based on the acceleration value; and generating, by the controller, the request braking amount based on the position value of the brake pedal and the weight of the vehicle.

The generating the auxiliary braking amount may include: checking, by the controller, a braking assistance map including a braking amount for each of a plurality of braking stage numbers included in a braking control lever that adjusts a braking force of the auxiliary brake; checking, by the controller, a braking stage number of the braking control lever; and generating, by the controller, the auxiliary braking amount by extracting a braking amount corresponding to the checked braking stage number from the braking assistance map.

The method for controlling regenerative braking of the hybrid commercial vehicle may further include: checking, by the controller, a hydraulic braking amount based on the final braking amount and the regenerative braking amount. The performing of the braking of the vehicle may include: operating, by the controller, the main brake based on the hydraulic braking amount to perform the braking of the vehicle; and performing, by the controller, regenerative braking of the vehicle based on the regenerative braking amount.

Additionally, the method for controlling regenerative braking of the hybrid commercial vehicle may include: generating, by the controller, a reference value using the final braking amount and a design coefficient after the braking of the vehicle is performed; checking, by the controller, the hydraulic braking amount of the main brake when the main brake is operated; determining, by the controller, whether the hydraulic braking amount of the main brake is less than or equal to the reference value; and performing, by the controller, the braking of the vehicle using the auxiliary brake when the hydraulic braking amount of the main brake is less than or equal to the reference value. The determining of whether the braking request condition of the vehicle is satisfied based on the state data may include: determining, by the controller, that the braking request condition is satisfied when a position value of a brake pedal of the vehicle included in the state data is greater than or equal to a reference value.

An exemplary embodiment of the present disclosure may provide the device for adjusting regenerative braking of the hybrid commercial vehicle, may include: an auxiliary brake configured to assist a braking force of the vehicle; a state detector configured to detect state data for adjusting regenerative braking of the vehicle; and a controller configured to generate a request braking amount using the state data, generate an auxiliary braking amount of the auxiliary brake when an operation switch of the auxiliary brake is on, generate a final braking amount based on the request braking amount and the auxiliary braking amount, generate a regenerative braking amount based on the final braking amount, and perform braking of the vehicle based on the final braking amount.

The controller may be configured to check a position value of a brake pedal of the vehicle and an acceleration value of the vehicle that are included in the state data, check a weight of the vehicle based on the acceleration value, and generate the request braking amount based on the position value of the brake pedal and the weight of the vehicle. The controller may be configured to check a braking assistance map including a braking amount for each of a plurality of braking stage numbers included in a braking control lever that adjusts a braking force of the auxiliary brake, check a braking stage number of the braking control lever, and generate the auxiliary braking amount by extracting a braking amount that corresponds to the checked braking stage number from the braking assistance map.

The controller may be configured to check a hydraulic braking amount based on the final braking amount and the regenerative braking amount, operate a main brake of the vehicle based on the hydraulic braking amount to perform the braking of the vehicle, and perform regenerative braking of the vehicle based on the regenerative braking amount. The controller may be configured to generate a reference value using the final braking amount and a design coefficient, check the hydraulic braking amount of the main brake when the main brake is operated, and perform the braking of the vehicle using the auxiliary brake when the hydraulic braking amount of the main brake is less than or equal to the reference value.

Additionally, the controller may be configured to perform braking of the vehicle through a main brake of the vehicle and the auxiliary brake based on the final braking amount when a regenerative braking stop condition is satisfied. The controller may be configured to determine that the braking request condition of the vehicle is satisfied when a position value of a brake pedal of the vehicle included in the state data is greater than or equal to a reference value.

The state detector may include: a brake pedal position detector configured to detect a position value of a brake pedal of the vehicle; a speed detector configured to detect a speed of the vehicle; an acceleration detector configured to detect acceleration of the vehicle; an operation detector configured to detect on or off of the operation switch of the auxiliary brake; and a stage number detector configured to detect a braking stage number of a braking control lever of the auxiliary brake.

The method and the device for controlling regenerative braking of the hybrid commercial vehicle according to the exemplary embodiment of the present disclosure may perform the regenerative braking using the auxiliary brake so that the exemplary embodiment of the present disclosure increases the amount of regenerative braking. Further, the exemplary embodiment of the present disclosure may perform braking using the main brake or the auxiliary brake so that the exemplary embodiment of the present disclosure improves braking force and safety of the vehicle.

In addition to the aforementioned advantageous effect, an effect that may be obtained or anticipated by applying an exemplary embodiment of the present disclosure will be disclosed explicitly or implicitly in the detailed description of the exemplary embodiment of the present disclosure. In other words, various effects expected by applying an exemplary embodiment of the present disclosure will be disclosed within the detailed description to be provided later.

BRIEF DESCRIPTION OF THE DRAWINGS

These and/or other aspects of the disclosure will become apparent and more readily appreciated from the following description of the exemplary embodiments, taken in conjunction with the accompanying drawings of which.

DETAILED DESCRIPTION

Figure 1:
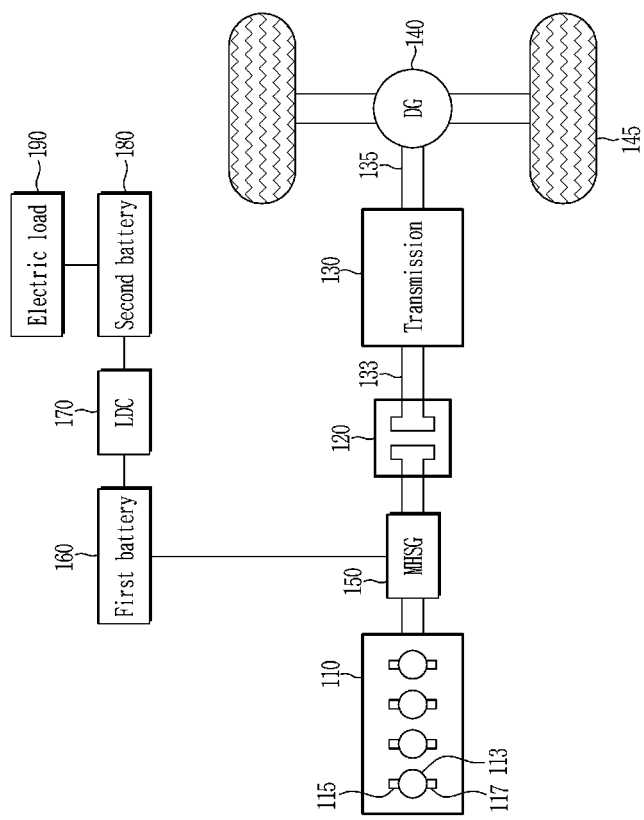
FIG. 1 is a configuration diagram showing a hybrid commercial vehicle to which a method for controlling regenerative braking of the vehicle according to an exemplary embodiment of the present disclosure is applied.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, an operation principle of a method and a device for controlling regenerative braking of a hybrid commercial vehicle of the present disclosure will be described in detail with reference to the description and the accompanying drawings. However, the drawings and the detailed description relate to one exemplary embodiment among several exemplary embodiments for effectively describing features of the present disclosure. Therefore, the present disclosure is not limited only to the drawings and description.

Further, in describing below exemplary embodiments of the present disclosure, the related well-known functions or constructions will not be described in detail since they may unnecessarily obscure the understanding of the present disclosure. Further, the following terminologies are defined in consideration of the functions in the present disclosure and may be construed in different ways by the intention of users and operators, practice, or the like. Therefore, the definitions thereof should be construed based on the contents throughout the specification. Further, to effectively describe core technical features of the present disclosure, terms may be appropriately changed, integrated, or separated for those skilled in the art in a technical field to which the present disclosure belongs to explicitly understand the present disclosure, but the present disclosure is not limited thereto.

Hereinafter, one exemplary embodiment of the present disclosure will be described in detail with reference to the accompanying drawings.

FIG. 1 is a configuration diagram showing a hybrid commercial vehicle to which a method for controlling regenerative braking of the vehicle according to an exemplary embodiment of the present disclosure is applied. FIG. 1 represents a mild hybrid commercial vehicle included in the hybrid commercial vehicle. The hybrid commercial vehicle (e.g., a hybrid electric commercial vehicle) may include a commercial vehicle including a motor.

Referring to FIG. 1, the hybrid commercial vehicle may include an engine 110, an electronic clutch 120, a transmission 130, a differential gear device 140, a driving wheel 145, a starter-generator or a mild hybrid starter and generator (MHSG) 150, a first battery 160, a low voltage DC-DC Converter (LDC) 170, a second battery 180, and an electric load 190.

The engine 110 may combust fuel to generate torque. The engine 110 may convert chemical energy into mechanical energy by combusting fuel and air. The engine 110 may include combustion chambers 113, ignition devices 115, and injectors 117. Fuel and air may flow in the combustion chamber 113, the ignition device 115 may ignite the fuel and the air flowed in the combustion chamber 113, and the injector 117 may inject fuel into the combustion chamber 113. For example, the engine 110 may be a gasoline engine, a diesel engine, or a liquefied petroleum injection (LPI) engine.

In a power delivery of the hybrid commercial vehicle, torque of the engine 110 may be transmitted to an input shaft 133 of the transmission 130, and torque output from an output shaft 135 of the transmission 130 may be transmitted to an axle via the differential gear device 140. When the axle rotates the driving wheel 145, the hybrid commercial vehicle may be driven by torque of the engine 110. The electronic clutch 120 may be positioned between engine 110 and the transmission 130. The electronic clutch 120 may be engaged or released (e.g., disengaged) to transmit or block a torque of the engine 110 to the driving wheel 145. When the electronic clutch 120 is in an engaged state, a drive shaft of the engine 110 and a drive shaft of the transmission 130 may be connected to transmit the torque of the engine 110 to the driving wheel 145. When the electronic clutch 120 is in a released state, the drive shaft of the engine 110 and the drive shaft of the transmission 130 may be not connected so that the torque of the engine 110 is not transmitted to the driving wheel 145.

The transmission 130 may be configured to convert an output torque of the engine 110 to a target torque. The transmission 130 may select a shift stage or a transmission stage according to the vehicle speed and a position value of an accelerator pedal of the vehicle to convert a received torque to the target torque, and may be configured to output the converted target torque to the driving wheel 145 to drive the vehicle. The transmission 130 may be an automatic transmission or a manual transmission.

The MHSG 150 may be mounted or installed between the engine 110 and the electronic clutch 120, and may be configured to convert electrical energy to mechanical energy or mechanical energy to electrical energy. In other words, the MHSG 150 may be configured to start the engine 110 or generate electricity by an output of the engine. In addition, the MHSG 150 may be configured to assist the torque of the engine 110. The hybrid commercial vehicle may use the torque of the MHSG 150 as an auxiliary power while combustion torque of the engine 110 is a main power.

It is described that the MHSG 150 is disposed between the engine 110 and the electronic clutch 120, but the present disclosure is not limited thereto. For example, the MHSG 150 may be connected to the engine 110 via a belt at a front end of the engine 110, may be positioned between the electronic clutch 120 and the transmission 130, may be positioned behind the transmission 130, or may be positioned between the differential gear device 140 and the driving wheel 145.

The first battery 160 may be configured to supply electric power to the MHSG 150 or may be charged by electric power collected using the MHSG 150. The first battery 160 may be a high voltage battery and may be referred to as a main battery. For example, the first battery 160 may be a lithium-ion battery. The lithium-ion battery may have rapid charging and discharging speed and good durability, but may have poor energy storage performance and poor charging and discharging efficiency at an extremely low temperature.

The LDC 170 may be configured to convert a voltage (e.g., about 48 V) supplied from the first battery 160 to a low voltage (e.g., about 12 V) to charge the second battery 180. The second battery 180 may be charged through electric power supplied from the LDC 170. The second battery 180 may be a low voltage battery and may be called an auxiliary battery. The second battery 180 may be configured to supply electric power to the electric load 190 using low voltage. For example, the second battery 180 may be an absorptive glass mat (AGM) battery or a lead-acid battery. The electric load 190 may represent a part driven by the second battery 180. For example, the electric load 190 may include a headlight, a fog light, a wiper, and an air conditioner.

Figure 2:
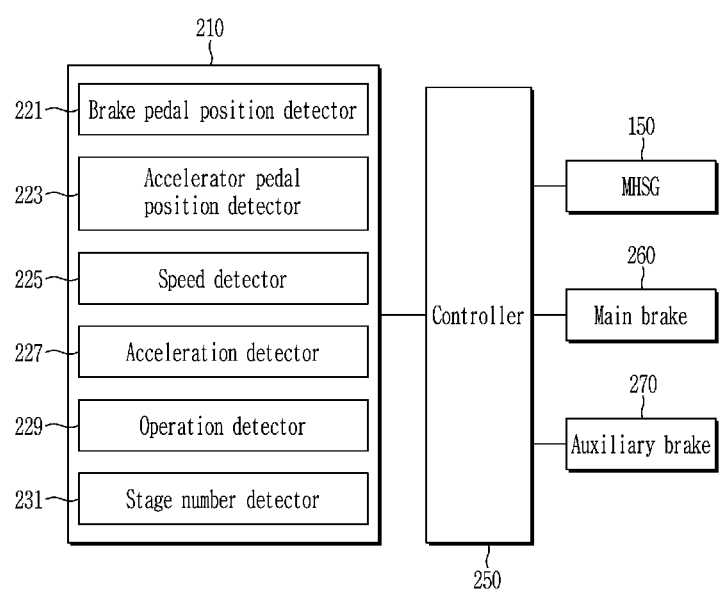
FIG. 2 is a block diagram showing a device for controlling regenerative braking of the vehicle according to an exemplary embodiment of the present disclosure.

FIG. 2 is a block diagram showing a device for controlling regenerative braking of the vehicle according to an exemplary embodiment of the present disclosure. Referring to FIG. 2, the device for controlling regenerative braking of the hybrid commercial vehicle may include a state detector 210, a controller 250, the MHSG 150, a main brake 260, and an auxiliary brake 270.

The state detector 210 may be configured to detect state data for adjusting regenerative braking of the vehicle. The state detector 210 may include a brake pedal position detector 221, an accelerator pedal position detector 223, a speed detector 225, an acceleration detector 227, an operation detector 229, and a stage number detector 231. The brake pedal position detector 221 may be configured to detect a degree to which a driver of the vehicle engages a brake pedal of the vehicle (e.g., amount of force exerted onto the pedal). The brake pedal position detector 221 may be configured to detect a position value of the brake pedal (i.e., a degree to which the brake pedal is engaged) to provide a signal corresponding to the detected value to the controller 250.

A position value of the brake pedal may be 100% when the brake pedal is fully engaged, and the position value of the brake pedal may be 0% when the brake pedal is disengaged. The accelerator pedal position detector 223 may be configured to detect a degree to which the driver engages an accelerator pedal of the vehicle. The accelerator pedal position detector 223 may be configured to detect a position value of the accelerator pedal (i.e., a degree to which the accelerator pedal is engaged) to provide a signal corresponding to the detected value to the controller 250. A position value of the accelerator pedal may be 100% when the accelerator pedal is fully engaged, and the position value of the accelerator pedal may be 0% when the accelerator pedal is disengaged.

The controller 250 may be implemented as at least one microprocessor operated by a program. The program may include a series of commands for executing the method for controlling regenerative braking of the hybrid commercial vehicle according to the exemplary embodiment of the present disclosure described below. The MHSG 150 may be configured to perform regenerative braking under an operation of the controller 250 to supply electric power to the first battery 160. The main brake 260 may be configured to provide braking hydraulic pressure to the driving wheel 145 under an operation of the controller 250 to perform braking of the hybrid commercial vehicle.

The acceleration detector 227 may be configured to detect acceleration of the hybrid commercial vehicle. The acceleration detector 227 may be configured to transmit the detected acceleration to the controller 250. When the acceleration detector 227 is not included in the state detector 210, the controller 250 may be configured to calculate the vehicle acceleration by differentiating the vehicle speed detected by the speed detector 225.

The operation detector 229 may be configured to detect on or off of an operation switch that operates the auxiliary brake 270 and may be configured to transmit the detected on or off of the operation switch to the controller 250. When the driver turns on the operation switch for operation of the auxiliary brake 270, the operation detector 229 may be configured to detect an on-state of the operation switch and transmit a detection signal corresponding to the on-state to the controller 250.

The stage number detector 231 may be configured to detect a number of a stage of braking of a braking control lever in the vehicle. The braking control lever may be a lever for receiving the stage number of braking corresponding to a braking force of the auxiliary brake 270 from the driver. The braking control lever may include a plurality of braking stage numbers. The stage number detector 231 may provide the detected number of braking stage to the controller 250.

The controller 250 may be configured to operate the state detector 210, the MHSG 150, the main brake 260, and the auxiliary brake 270 to adjust regenerative braking. The controller 250 may be configured to receive the state data from the state detector 210. The controller 250 may be configured to determine whether a braking request condition of the vehicle is satisfied based on the state data. The braking request condition may indicate a condition for determining whether the driver requests braking of the hybrid commercial vehicle.

When the braking request condition is satisfied, the controller 250 may be configured to generate a request braking amount based on the state data. The controller 250 may be configured to generate an auxiliary braking amount of the auxiliary brake 270 when the operation switch of the auxiliary brake 270 is in an on state. Additionally, the controller 250 may be configured to generate a final braking amount based on the request braking amount and the auxiliary braking amount. The controller 250 may be configured to generate a regenerative braking amount based on the final braking amount, and generate a hydraulic braking amount or a hydraulic pressure braking amount based on the final braking amount and the regenerative braking amount.

Further, the controller 250 may be configured to operate the MHSG 150 based on the regenerative braking amount to perform regenerative braking. The controller 250 may be configured to operate the main brake 260 based on the hydraulic braking amount to perform braking of the vehicle. The controller 250 may include a battery controller (e.g., a battery management system), a motor controller, an engine controller, a transmission controller, and a brake controller (e.g., an electric brake system), but the present disclosure is not limited thereto.

In another exemplary embodiment of the present disclosure, a throttle valve opening detector mounted on an intake passage of the vehicle may be used instead of the accelerator pedal position detector 223. The accelerator pedal position detector 223 may include the throttle valve opening detector. The speed detector 225 may be configured to detect a speed of the hybrid commercial vehicle and may provide the vehicle speed to the controller 250. The speed detector 225 may be installed at the driving wheel 145 of the hybrid commercial vehicle.

The auxiliary brake 270 may be configured to assist a braking force of the vehicle. In other words, the auxiliary brake 270 may be configured to assist an operation of the main brake 260 according to an operation of the controller 250. The auxiliary brake 270 may include an exhaust brake, an engine brake, a Jake brake, an intarder, or a retarder.

Figure 3:
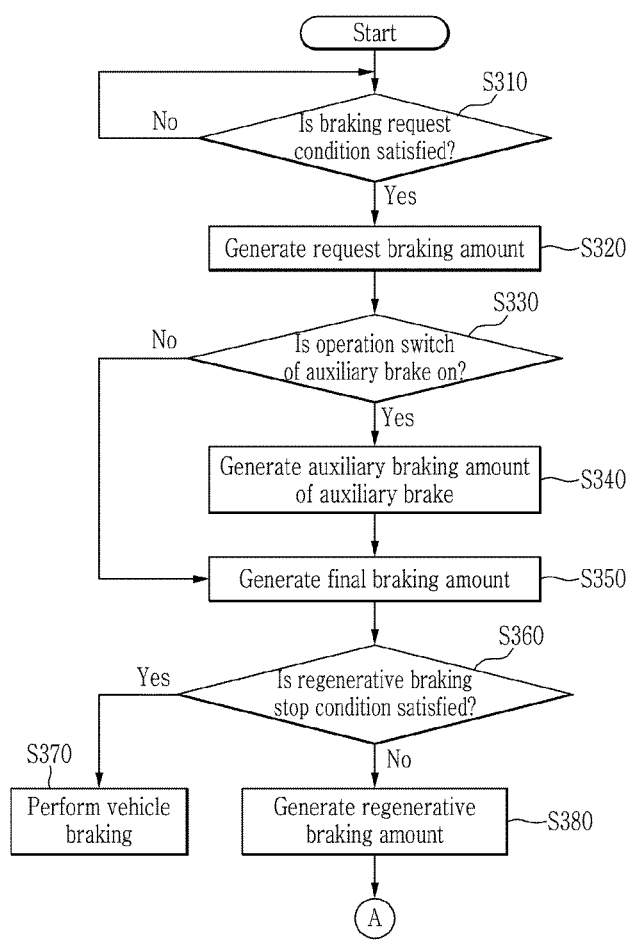
FIG. 3 and FIG. 4 are flowcharts showing the method of controlling regenerative braking of the vehicle according to an exemplary embodiment of the present disclosure.
Figure 4:
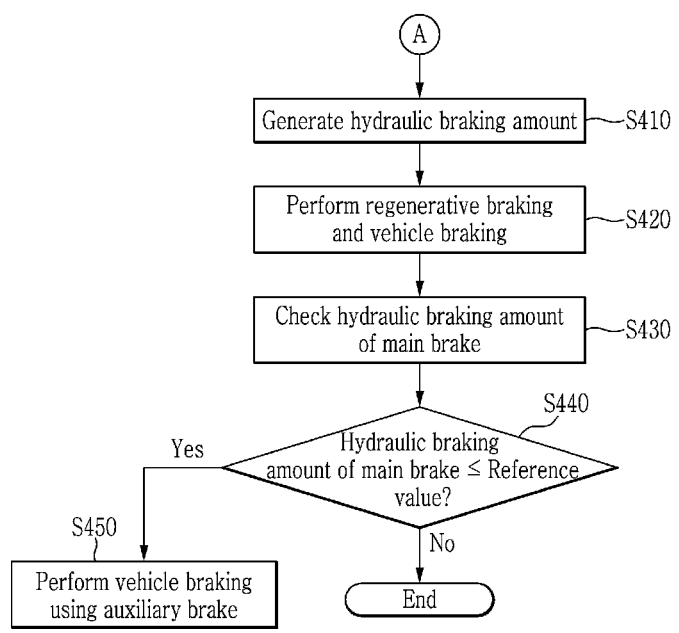

The method for controlling regenerative braking of the hybrid commercial vehicle will be described in more detail referring to FIG. 3 and FIG. 4. FIGS. 3 and 4 are flowcharts showing the method of controlling regenerative braking of the vehicle according to an exemplary embodiment of the present disclosure. Referring to FIG. 3, the controller 250 may be configured to determine whether the braking request condition is satisfied based on the state data in step S310.

In particular, the controller 250 may be configured to receive a brake pedal position value from the brake pedal position detector 221 of the state detector 210. The controller 250 may be configured to determine whether the position value of the brake pedal is greater than or equal to a first reference value so that the controller determines whether the braking request condition is satisfied. The first reference value may represent a value for determining whether braking of the vehicle is requested based on the brake pedal, and may be preset.

The controller 250 may be configured to check a position value of the accelerator pedal. The controller 250 may be configured to receive the position value of the accelerator pedal from the accelerator pedal position detector 223. Additionally, the controller 250 may be configured to determine whether the position value of the accelerator pedal is less than or equal to a second reference value. The second reference value may be a value for determining whether the accelerator pedal is off, and may be set in advance. For example, the second reference value may be 0.

When the braking request condition is not satisfied, the controller 250 may be configured to again monitor the state data to determine whether the braking request condition is satisfied. When the braking request condition is satisfied, the controller 250 may be configured to generate or calculate a request braking amount based on the state data in step S320. When the position value of the brake pedal is greater than or equal to the first reference value and the position value of the accelerator pedal is less than or equal to the second reference value, the controller 250 may be configured to check the position value of the brake pedal.

The controller 250 may be configured to receive an acceleration value of the vehicle from the acceleration detector 227 of the state detector 210. The controller 250 may be configured to check a weight of the hybrid commercial vehicle based on the acceleration value. The controller 250 may be configured to generate the request braking amount based on the position value of the brake pedal and the weight of the vehicle. In particular, the controller 250 may be configured to check a control map including braking amounts according to a plurality of brake pedal position values and a plurality of weights of the vehicle. The control map may be a map table or a memory. The controller 250 may be configured to generate the request braking amount by extracting the braking amount based on the position value of the brake pedal and the weight of the vehicle from the control map.

Additionally, the controller 250 may be configured to determine whether the operation switch of the auxiliary brake 270 is in an on state in step S330. The controller 250 may be configured to receive the detection signal from the operation detector 229 of the state detector 210, and determine whether the operation switch is on based on the detection signal. When the operation switch is on, the controller 250 may be configured to generate the auxiliary braking amount of the auxiliary brake 270 in step S340.

Particularly, the controller 250 may be configured to check a braking assistance map including a braking amount for each of a plurality of the braking stage numbers. The braking assistance map may be a map table or a memory. The braking amount may be a maximum allowable braking amount in the auxiliary brake 270. The braking assistance map may be set in advance or may be reset through learning.

The controller 250 may be configured to receive a braking stage number engaged in the braking control lever from the stage number detector 231 of the state detector 210. The controller 250 may be configured to generate the auxiliary braking amount by extracting a braking amount corresponding to a braking stage number detected by the stage number detector 231 from the braking assistance map. In addition, the controller 250 may be configured to generate the final braking amount based on the request braking amount and the auxiliary braking amount in step S350. For example, the controller 250 may be configured to generate the final braking amount by adding the auxiliary braking amount to the request braking amount.

The controller 250 may be configured to generate the request braking amount as the final braking amount when the operation switch of the auxiliary brake 270 is in an off state. The controller 250 may be configured to determine whether a regenerative braking stop condition is satisfied in step S360. The regenerative braking stop condition may include a condition in which an operation for stopping regenerative braking is requested during shifting of the transmission 130 or a failure of the MENG 150 that is a regenerative braking system.

In the step S360 the controller may be configured to determine that the regenerative braking stop condition is satisfied after the final braking amount is generated, but the present disclosure is not limited thereto. In another exemplary embodiment of the present disclosure, the controller 250 may be configured to determine whether the regenerative braking stop condition is satisfied immediately after the step S320. The controller 250 may be configured to perform braking of the vehicle using the main brake 260 and the auxiliary brake 270 when the regenerative braking stop condition is satisfied in step S370. In particular, when the regenerative braking stop condition is satisfied, the controller 250 may be configured to stop regenerative braking, and perform braking of the vehicle through the main brake 260 and the auxiliary brake 270 based on the final braking amount.

Further, the controller 250 may be configured to generate the regenerative braking amount based on the final braking amount when the regenerative braking stop condition is not satisfied in step S380. In particular, the controller 250 may be configured to generate a regenerative braking available amount based on a shifting state of the transmission 130, a charging state of the first battery 160, a state of the starter-generator 150, an altitude of a road that the vehicle drives on, or an altitude of a downhill road that the vehicle is being driven on, and generate the regenerative braking amount based on the final braking quantity and the regenerative braking available amount.

The controller 250 may be configured to generate the hydraulic braking amount based on the final braking amount and the regenerative braking amount in step S410. For example, the controller 250 may be configured to generate the hydraulic braking amount by subtracting the regenerative braking amount from the final braking amount. The controller 250 may be configured to perform regenerative braking based on the regenerative braking amount, and perform braking of the vehicle based on the hydraulic braking amount in step S420.

Particularly, the controller 250 may be configured to generate a regenerative braking torque according to the regenerative braking amount, generate a motor torque according to the regenerative braking torque, and operate the MHSG 150 based on the motor torque to perform the regenerative braking. The controller 250 may be configured to adjust the hydraulic pressure supplied to a brake cylinder included in the main brake 260 based on the hydraulic braking amount to perform the braking of the hybrid commercial vehicle. The controller 250 may then be configured to check the hydraulic braking amount of the main brake 260 when the main brake is operated in step S430.

The controller 250 may be configured to determine whether the hydraulic braking amount of the main brake 260 is less than or equal to a reference value or a threshold value in step S440. In particular, the controller 250 may be configured to generate the reference value using the final braking amount and a design coefficient. The controller 250 may be configured to generate the reference value by multiplying the final braking amount by the design coefficient. The design coefficient is a coefficient designed to check a braking force of the main brake 260, and may be set through a test. For example, the design coefficient may be 0.98. The controller 250 may be configured to determine whether the hydraulic braking amount of the main brake 260 is less than or equal to the reference value to determine whether the braking force of the main brake 260 is insufficient.

Additionally, the controller 250 may be configured to perform braking of the vehicle through the auxiliary brake 270 when the hydraulic braking amount of the main brake 260 is less than or equal to the reference value in step S450. In particular, the controller 250 does not secure a sufficient braking force of the vehicle from the main brake 260 when the hydraulic braking amount of the main brake 260 is less than or equal to the reference value. Therefore, the controller 250 may be configured to operate the auxiliary brake 270 to provide an additional braking force to the vehicle. The controller 250 may be configured to perform braking of the vehicle through the auxiliary brake 270 based on the auxiliary braking amount. The controller 250 may be configured to check an auxiliary braking amount performed by the auxiliary brake 270. The controller 250 may then be configured to reset the braking assistance map based on the auxiliary braking amount performed by the auxiliary brake 270 and the braking stage number of the braking control lever. Since the braking assistance map is reset, the braking amount of the auxiliary brake 270 may be determined more accurately.

The method of controlling regenerative braking for the hybrid commercial vehicle according to the exemplary embodiment of the present disclosure may perform regenerative braking by including the auxiliary braking amount of the auxiliary brake 170 in the regenerative braking amount when the auxiliary brake 170 is operated by the driver. Thus, an amount of the regenerative braking may be increased compared to a case where regenerative braking is performed in an existing vehicle.

While this disclosure has been described in connection with what is presently considered to be practical exemplary embodiments, it is to be understood that the disclosure is not limited to the disclosed exemplary embodiments, but, on the contrary, is intended to cover various modifications and equivalent arrangements included within the spirit and scope of the appended claims.

DESCRIPTION OF SYMBOLS

110: engine
120: electronic clutch
130: transmission
140: differential gear device
145: driving wheel
150: MHSG
160: first battery
170: LDC
180: second battery
190: electric load
210: state detector
250: controller
260: main brake
270: auxiliary brake

What is claimed is:

1. A method for controlling regenerative braking of a hybrid commercial vehicle that includes a main brake and an auxiliary brake, comprising:

determining, by a controller, whether a braking request condition of the vehicle is satisfied based on a state data;

generating, by the controller, a request braking amount based on the state data when the braking request condition is satisfied;

determining, by the controller, whether an operation switch of the auxiliary brake is on;

generating, by the controller, an auxiliary braking amount of the auxiliary brake in response to determining that the operation switch is on;

generating, by the controller, a final braking amount based on the request braking amount and the auxiliary braking amount;

generating, by the controller, a regenerative braking amount based on the final braking amount;

performing, by the controller, braking of the vehicle based on the final braking amount;

checking by the controller, a hydraulic braking amount based on the final braking amount and the regenerative braking amount;

wherein performing the braking of the vehicle includes:
      operating, by the controller, the main brake based on the hydraulic braking amount to perform the braking of the vehicle; and
      performing, by the controller, regenerative braking of the vehicle based on the regenerative braking amount;

generating, by the controller, a reference value using the final braking amount and a design coefficient after the braking of the vehicle is performed;

checking, by the controller, the hydraulic braking amount of the main brake when the main brake is operated;

determining, by the controller, whether the hydraulic braking amount of the main brake is less than or equal to the reference value; and performing, by the controller, the braking of the vehicle using the auxiliary brake in response to determining that the hydraulic braking amount of the main brake is less than or equal to the reference value.

2. The method of claim 1, wherein generating the request braking amount includes:

checking, by the controller, a position value of a brake pedal of the vehicle and an acceleration value of the vehicle that are included in the state data in response to determining that the braking request condition is satisfied;

checking, by the controller, a weight of the vehicle based on the acceleration value; and generating, by the controller, the request braking amount based on the position value of the brake pedal and the weight of the vehicle.

3. The method of claim 1, wherein generating the auxiliary braking amount includes:

checking, by the controller, a braking assistance map including a braking amount for each of a plurality of braking stage numbers included in a braking control lever that adjusts a braking force of the auxiliary brake;

checking, by the controller, a braking stage number of the braking control lever; and generating, by the controller, the auxiliary braking amount by extracting a braking amount corresponding to the checked braking stage number from the braking assistance map.

4. The method of claim 1, wherein determining whether the braking request condition of the vehicle is satisfied based on the state data includes:

determining, by the controller, that the braking request condition is satisfied in response to determining a position value of a brake pedal of the vehicle included in the state data is greater than or equal to a reference value.

5. A device for controlling regenerative braking of a hybrid commercial vehicle, comprising:
   an auxiliary brake configured to assist a braking force of the vehicle;
   a state detector configured to detect state data for adjusting regenerative braking of the vehicle; and
   a controller configured to generate a request braking amount using the state data, generate an auxiliary braking amount of the auxiliary brake when an operation switch of the auxiliary brake is on, generate a final braking amount based on the request braking amount and the auxiliary braking amount, generate a regenerative braking amount based on the final braking amount, and perform braking of the vehicle based on the final braking amount;
   wherein the controller is configured to check a hydraulic braking amount based on the final braking amount and the regenerative braking amount, operate a main brake of the vehicle based on the hydraulic braking amount to perform the braking of the vehicle, and perform regenerative braking of the vehicle based on the regenerative braking amount; and
   wherein the controller is configured to generate a reference value using the final braking amount and a design coefficient, check the hydraulic braking amount of the main brake when the main brake is operated, and perform the braking of the vehicle using the auxiliary brake when the hydraulic braking amount of the main brake is less than or equal to the reference value.

6. The device of claim 5, wherein the controller is configured to check a position value of a brake pedal of the vehicle and an acceleration value of the vehicle that are included in the state data, check a weight of the vehicle based on the acceleration value, and generate the request braking amount based on the position value of the brake pedal and the weight of the vehicle.

7. The device of claim 5, wherein the controller is configured to check a braking assistance map including a braking amount for each of a plurality of braking stage numbers included in a braking control lever that adjusts a braking force of the auxiliary brake, check a braking stage number of the braking control lever, and generate the auxiliary braking amount by extracting a braking amount corresponding to the checked braking stage number from the braking assistance map.

8. The device of claim 5, wherein the controller is configured to perform braking of the vehicle through a main brake of the vehicle and the auxiliary brake based on the final braking amount in response to determining that a regenerative braking stop condition is satisfied.

9. The device of claim 5, wherein the controller is configured to determine that the braking request condition of the vehicle is satisfied in response to determining that a position value of a brake pedal of the vehicle included in the state data is greater than or equal to a reference value.

10. The device of claim 5, wherein the state detector includes:
   a brake pedal position detector configured to detect a position value of a brake pedal of the vehicle;
   a speed detector configured to detect a speed of the vehicle;
   an acceleration detector configured to detect acceleration of the vehicle;
   an operation detector configured to detect on or off of the operation switch of the auxiliary brake; and
   a stage number detector configured to detect a braking stage number of a braking control lever of the auxiliary brake.

* * * * *